United States Patent
Zhou et al.

(10) Patent No.: US 12,015,543 B2
(45) Date of Patent: Jun. 18, 2024

(54) METHOD FOR CONFIGURING PERFORMANCE MEASUREMENT INDICATION INFORMATION AND RELATED DEVICE

(71) Applicant: HUAWEI TECHNOLOGIES CO., LTD., Shenzhen (CN)

(72) Inventors: Tianran Zhou, Beijing (CN); Min Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 4 days.

(21) Appl. No.: 17/892,240

(22) Filed: Aug. 22, 2022

(65) Prior Publication Data
US 2022/0400072 A1 Dec. 15, 2022

Related U.S. Application Data

(63) Continuation of application No. PCT/CN2020/118670, filed on Sep. 29, 2020.

(30) Foreign Application Priority Data

Feb. 27, 2020 (CN) .......................... 202010125662.7

(51) Int. Cl.
*H04L 45/12* (2022.01)
*H04L 41/08* (2022.01)
(Continued)

(52) U.S. Cl.
CPC ........ *H04L 45/123* (2013.01); *H04L 41/0889* (2013.01); *H04L 45/04* (2013.01); *H04L 45/14* (2013.01); *H04L 45/26* (2013.01)

(58) Field of Classification Search
CPC ... H04L 45/123; H04L 41/0889; H04L 45/04; H04L 45/14; H04L 41/14; H04L 45/26;
(Continued)

(56) References Cited

U.S. PATENT DOCUMENTS

2008/0316914 A1* 12/2008 Vercellone .............. H04L 45/28
370/216
2015/0036510 A1* 2/2015 Bao .......................... H04L 43/10
370/241.1
2022/0021646 A1* 1/2022 Joshi ................... H04L 67/1001

FOREIGN PATENT DOCUMENTS

CN 105376098 A 3/2016
CN 105577543 A 5/2016
(Continued)

OTHER PUBLICATIONS

Marques et al., "Dissemination of Flow Specification Rules", Network Working Group, Category: Standards Track, Request for Comments: 5575, Aug. 2009, 22 pages.
(Continued)

*Primary Examiner* — Mohamed A Kamara
(74) *Attorney, Agent, or Firm* — Maier & Maier, PLLC

(57) ABSTRACT

A method for configuring performance measurement indication information and a related device. The method includes: a control node determines performance measurement indication information and sends a first advertisement packet in the communication network based on the BGP, where the first advertisement packet carries the performance measurement indication information, so that a plurality of forwarding nodes configure the performance measurement indication information on the plurality of forwarding nodes. In this way, when a data flow on which performance measurement is to be performed is transmitted between a plurality of different ASs, each forwarding node in the different ASs may obtain the performance measurement indication information from the first advertisement packet.

14 Claims, 3 Drawing Sheets

(51) Int. Cl.
*H04L 45/00* (2022.01)
*H04L 45/02* (2022.01)

(58) Field of Classification Search
CPC ... H04L 41/0213; H04L 45/02; H04L 45/655; H04L 41/08; H04L 41/0886; H04L 43/08; H04L 43/10; H04L 43/50
See application file for complete search history.

(56) References Cited

FOREIGN PATENT DOCUMENTS

| | | |
|---|---|---|
| EP | 3422660 A1 | 1/2019 |
| WO | 2011029241 A1 | 3/2011 |
| WO | 2017215400 A1 | 12/2017 |

OTHER PUBLICATIONS

Chen et al., "Network-wide Protocol Monitoring (NPM): Use Cases; draft-then-npm-use-cases 00", Internet-Draft, Network Working Group, Internet Engineering Task Force, IETF, Standardworkingdraft, Internet Society, XP015131728, Mar. 11, 2019, 16 pages.
Phan et al., "Toward a Flexible and Scalable Monitoring Framework in Software-Defined Networks", 2017 31st International Conference On Advanced Information Networking and Applications Workshops (WAINA), IEEE, XP033099391, Mar. 27, 2017, 6 pages.
Alotaibi et al., "Utilising SDN to Counter BGP Convergence Delays", 2019 29th International Telecommunication Networks and Applications Conference (ITNAC), IEEE, XP033763403, Nov. 27, 2019, 6 pages.

* cited by examiner

METHOD FOR CONFIGURING PERFORMANCE MEASUREMENT INDICATION INFORMATION AND RELATED DEVICE

CROSS-REFERENCE TO RELATED APPLICATIONS

This application is a continuation of International Application No. PCT/CN2020/118670, filed on Sep. 29, 2020, which claims priority to Chinese Patent Application No. 202010125662.7, filed on Feb. 27, 2020. The disclosures of the aforementioned applications are hereby incorporated by reference in their entities.

TECHNICAL FIELD

The embodiments relate to the field of routing technologies, a method for configuring performance measurement indication information, and a related device.

BACKGROUND

With development of internet technologies, more attention is paid to performance measurement of various data flows in a network. Performance measurement on a data flow includes performance measurement in different modes such as a path topology, a packet loss rate, and a transmission delay measurement mode. Real-time information of a forwarding node of a data packet in the data flow needs to be collected to implement performance measurement on a data flow. For example, when a measurement mode is the path topology measurement mode, interface information used by each forwarding node to receive and send a data packet needs to be collected. Before performance measurement is performed on a data flow, performance measurement indication information needs to be configured on each forwarding node. The performance measurement indication information is used to indicate a type of data flow on which performance measurement is to be performed and a measurement mode, so that each node subsequently collects measurement data of a received data packet based on the performance measurement indication information.

In a related technology, to facilitate management of a large-scale network, the network is divided into different autonomous systems (AS). Each AS includes a group of nodes. These nodes may be devices such as routers, and all nodes in a same AS are managed by a same controller. When performance measurement needs to be performed on a data flow that is transmitted between a plurality of ASs, for each node in any one AS, a skilled person configures the performance measurement indication information on each node by using a command line or a mechanism (NetConf) for managing a network device on a controller. Because the performance measurement indication information needs to be first manually configured on each node in each AS, efficiency of configuring the performance measurement indication information is low.

SUMMARY

The embodiments may provide a method for configuring performance measurement indication information and a related device, to improve efficiency of configuring performance measurement indication information.

According to a first aspect, a method for configuring performance measurement indication information is provided, where the method is applied to a control node in a communication network, the communication network further includes a plurality of forwarding nodes, and the plurality of forwarding nodes are located in different ASs. In the method, the control node determines performance measurement indication information, where the performance measurement indication information is used to indicate a data flow on which performance measurement is to be performed and one or more target measurement modes for performing performance measurement on the data flow. The control node sends a first advertisement packet in the communication network based on the border gateway protocol (border gateway protocol, BGP), where the first advertisement packet carries the performance measurement indication information, so that the plurality of forwarding nodes configures the performance measurement indication information on the plurality of forwarding nodes.

In this embodiment, the BGP is extended, so that the control node in the communication network can send, based on the extended BGP, the first advertisement packet that carries the performance measurement indication information. In this way, when a data flow on which performance measurement is to be performed is transmitted between a plurality of different ASs, each forwarding node in the different ASs may obtain the performance measurement indication information from the first advertisement packet, so that the performance measurement indication information is configured on each forwarding node. In other words, the first advertisement packet may be used to uniformly configure the performance measurement indication information for each forwarding node in each AS based on a complete transmission chain of the data flow. In this way, the performance measurement indication information does not need to be manually configured for each AS in the transmission chain of the data flow through the control node in the AS, so that efficiency of configuring the performance measurement indication information is improved. In addition, the performance measurement indication information may be uniformly configured for each forwarding node in each AS based on the complete transmission chain of the data flow. In other words, the performance measurement indication information is configured at a service domain level, but not at a management domain level of each AS. In this way, when the service domain is larger than the management domain, the performance measurement indication information of all management domains may be configured at a time by using the method provided in this embodiment, so that efficiency of configuring the performance measurement indication information is improved.

Based on the method provided in the first aspect, in a possible implementation, the first advertisement packet may be a BGP FS packet, and the BGP FS packet includes network layer reachability information and action indication information. The network layer reachability information carries first indication information, the first indication information is used to indicate the data flow, the action indication information carries second indication information, and the second indication information is used to indicate the one or more target measurement modes.

In this embodiment, an existing BGP FS packet in the BGP may be extended, so that the BGP FS packet can carry the foregoing performance measurement indication information, and there is no need to extend a new type of packet. In this way, efficiency of configuring the performance measurement indication information is improved, and the method for configuring performance measurement indication information is facilitated.

Based on the method provided in the first aspect, in a possible implementation, the foregoing action indication information further carries third indication information, and the third indication information is used to indicate a measurement data type associated with each of the one or more target measurement modes. The measurement data type associated with each target measurement mode is used to indicate measurement data that needs to be collected in the corresponding target measurement mode.

Further, to help each forwarding node collect information in a performance measurement process, the performance measurement indication information may further carry the measurement data type associated with the target measurement mode. In this way, each forwarding node is configured with a to-be-performed target measurement mode, and further with a measurement data type that is associated with the target measurement mode, so that when subsequently determining that the data flow matches a data flow indicated in the performance measurement indication information, the forwarding node may directly collect measurement data based on the measurement data type that is associated with the target measurement mode. In this way, efficiency of subsequently collecting measurement data is improved.

Based on the method provided in the first aspect, in a possible implementation, the foregoing second indication information includes a bitmap field, the bitmap field includes a plurality of bits that are in a one-to-one correspondence with a plurality of measurement modes, a bit value of a bit that corresponds to each target measurement mode and that is in the plurality of bits is a first bit value, and the first bit value is used to indicate to enable a corresponding measurement mode.

In this embodiment, a bit value of a bit that corresponds to each measurement mode and that is in the bitmap field may be used to indicate a target measurement mode, so that efficiency of the control node in generating the first advertisement packet is improved, and efficiency of each forwarding node in subsequently determining the target measurement mode based on the bitmap field is also improved.

Based on the method provided in the first aspect, in a possible implementation, a parameter field may be set in the third indication information of the first advertisement packet, and the parameter field is used to indicate a measurement data type associated with each target measurement mode. The parameter field may be set in the first advertisement packet to enable the first advertisement packet to carry the measurement data type associated with the target measurement mode.

Based on the method provided in the first aspect, in a possible implementation, the first indication information includes a source address, a source port, a destination address, a destination port, and a protocol that are of the data flow, and the protocol is used to indicate a protocol used to forward a data packet in the data flow. 5-tuple attributes of the data flow may be used to indicate a to-be-measured data flow, so that efficiency of each forwarding node in subsequently filtering the to-be-measured data flow is improved.

Based on the method provided in the first aspect, in a possible implementation, before the performance measurement indication information is determined, in the method, second advertisement packets sent by at least two forwarding nodes in the plurality of forwarding nodes may be further received. The second advertisement packet includes indication information that is used to indicate a measurement mode supported by a sender of the second advertisement packet. In this scenario, the foregoing implementation for determining the performance measurement indication information may be: obtaining one or more alternative measurement modes for performing performance measurement on the data flow; selecting an effective measurement mode, as the one or more target measurement modes, from the one or more alternative measurement modes based on the second advertisement packet; and generating to-be-configured performance measurement indication information based on the one or more target measurement modes.

In this embodiment, discovery of a performance measurement capability of each forwarding node is supported, so that the control node can select an effective measurement mode, and a success rate of each forwarding node in subsequently collecting measurement data is improved.

According to a second aspect, a method for configuring performance measurement indication information is provided, where the method is applied to any forwarding node in a communication network, the communication network further includes a plurality of forwarding nodes and a control node, and the plurality of forwarding nodes are located in different ASs. In the method, a forwarding node receives a first advertisement packet that is sent by a control node based on the BGP and that is sent in the communication network, where the first advertisement packet carries performance measurement indication information, and the performance measurement indication information is used to indicate a data flow on which performance measurement is to be performed and one or more target measurement modes for performing performance measurement on the data flow. The forwarding node configures the performance measurement indication information on the forwarding node.

In this embodiment, the BGP is extended, so that the control node in the communication network can send, based on the extended BGP, the first advertisement packet that carries the performance measurement indication information. In this way, when a data flow on which performance measurement is to be performed is transmitted between a plurality of different ASs, each forwarding node in the different ASs may obtain the performance measurement indication information from the first advertisement packet, so that the performance measurement indication information is configured on each forwarding node. In other words, the first advertisement packet may be used to uniformly configure the performance measurement indication information for each forwarding node in each AS based on a complete transmission chain of the data flow. In this way, the performance measurement indication information does not need to be manually configured for each AS in the transmission chain of the data flow through the control node in the AS, so that efficiency of configuring the performance measurement indication information is improved. In addition, the performance measurement indication information may be uniformly configured for each forwarding node in each AS based on the complete transmission chain of the data flow. In other words, the performance measurement indication information is configured at a service domain level, but not at a management domain level of each AS. In this way, when the service domain is larger than the management domain, the performance measurement indication information of all management domains may be configured at a time by using the method provided in this embodiment.

According to a third aspect, a control node in a communication network is provided, where the communication network further includes a plurality of forwarding nodes located in different ASs, and the control node includes:

a determining module, configured to determine performance measurement indication information, where the performance measurement indication information is used to indicate a data flow on which performance measurement is to be performed and one or more target measurement modes for performing performance measurement on the data flow; and a sending module, configured to send a first advertisement packet in the communication network based on the BGP, where the first advertisement packet carries the performance measurement indication information, so that the plurality of forwarding nodes configures the performance measurement indication information on the plurality of forwarding nodes.

Based on the control node provided in the third aspect, in a possible implementation, the first advertisement packet is a BGP FS packet, and the BGP FS packet includes network layer reachability information and action indication information. The network layer reachability information carries first indication information, the first indication information is used to indicate the data flow, the action indication information carries second indication information, and the second indication information is used to indicate the one or more target measurement modes.

Based on the control node provided in the third aspect, in a possible implementation, the action indication information further carries third indication information, the third indication information is used to indicate a measurement data type associated with each of the one or more target measurement modes, and the measurement data type associated with each target measurement mode is used to indicate measurement data to be collected in the corresponding target measurement mode.

Based on the control node provided in the third aspect, in a possible implementation, the foregoing second indication information includes a bitmap field, the bitmap field includes a plurality of bits that are in a one-to-one correspondence with a plurality of measurement modes, a bit value of a bit that corresponds to each target measurement mode and that is in the plurality of bits is a first bit value, and the first bit value is used to indicate to enable a corresponding measurement mode.

Based on the control node provided in the third aspect, in a possible implementation, the third indication information includes a parameter field, and the parameter field is used to indicate a measurement data type associated with each target measurement mode.

Based on the control node provided in the third aspect, in a possible implementation, the first indication information includes a source address, a source port, a destination address, a destination port, and a protocol that are of the data flow, and the protocol is used to indicate a protocol used to forward a data packet in the data flow.

Based on the control node provided in the third aspect, in a possible implementation, the control node further includes:

a receiving module, configured to receive second advertisement packets sent by at least two forwarding nodes in the plurality of forwarding nodes, where the second advertisement packet includes indication information that is used to indicate a measurement mode supported by a sender of the second advertisement packet; and the determining module, configured to:

obtain one or more alternative measurement modes for performing performance measurement on the data flow;

select an effective measurement mode, as the one or more target measurement modes, from the one or more alternative measurement modes based on the second advertisement packet; and generate the performance measurement indication information based on the one or more target measurement modes.

In other words, according to the third aspect, a control node is provided. The control node has a function of implementing the method for configuring performance measurement indication information in the first aspect. The control node includes at least one module, and the at least one module is configured to implement the method for configuring performance measurement indication information provided in the first aspect.

According to a fourth aspect, a forwarding node in a communication network is provided, where the communication network further includes a plurality of forwarding nodes and a control node, the plurality of forwarding nodes is located in different ASs, and any one of the plurality of forwarding nodes includes:

a receiving module, configured to receive a first advertisement packet that is sent in the communication network by the control node based on the border gateway protocol BGP, where the first advertisement packet carries performance measurement indication information, and the performance measurement indication information is used to indicate a data flow on which performance measurement is to be performed and one or more target measurement modes for performing performance measurement on the data flow; and a configuration module, configured to configure the performance measurement indication information on the forwarding node.

In other words, according to the fourth aspect, a forwarding node is provided. The forwarding node has a function of implementing the method for configuring performance measurement indication information in the second aspect. The forwarding node includes at least one module, and the at least one module is configured to implement the method for configuring performance measurement indication information provided in the second aspect.

According to a fifth aspect, a control node in a communication network is provided, where the control node includes a memory and a processor, where the memory is configured to store a computer program; and the processor is configured to execute the program stored in the memory, to perform any one method according to the first aspect.

According to a sixth aspect, a forwarding node in a communication network is provided, where the forwarding node includes a memory and a processor, where the memory is configured to store a computer program; and the processor is configured to execute the program stored in the memory, to perform any one method according to the second aspect.

According to a seventh aspect, a non-transitory computer-readable storage medium is provided, where the non-transitory computer-readable storage medium stores instructions. When the instructions are run on a computer, the computer is enabled to perform the method for configuring performance measurement indication information according to the first aspect.

According to an eighth aspect, a non-transitory computer-readable storage medium is provided, where the non-transitory computer-readable storage medium stores instructions. When the instructions are run on a computer, the computer is enabled to perform the method for configuring performance measurement indication information according to the second aspect.

According to a ninth aspect, a computer program product including instructions is provided. When the computer program product is run on a computer, the computer is enabled to perform the method for configuring performance measurement indication information according to the first aspect.

According to a tenth aspect, a computer program product including instructions is provided. When the computer program product is run on a computer, the computer is enabled to perform the method for configuring performance measurement indication information according to the second aspect.

According to an eleventh aspect, a system for configuring performance measurement indication information is provided, where the system includes a control node and a plurality of forwarding nodes, and the plurality of forwarding nodes are located in different ASs, where the control node is configured to determine performance measurement indication information, where the performance measurement indication information is used to indicate a data flow on which performance measurement is to be performed and one or more target measurement modes for performing performance measurement on the data flow;

the control node is further configured to send a first advertisement packet in the communication network based on the BGP, where the first advertisement packet carries the performance measurement indication information, so that the plurality of forwarding nodes configures the performance measurement indication information on the plurality of forwarding nodes;

any one of the plurality of forwarding nodes is configured to receive the first advertisement packet that is sent in the communication network by the control node; and the forwarding node is further configured to configure the performance measurement indication information on the forwarding node.

For effects obtained in the third aspect to the eleventh aspect, refer to effects obtained by the first aspect and the second aspect. Details are not described herein again.

DETAILED DESCRIPTION OF THE EMBODIMENTS

Figure 1:
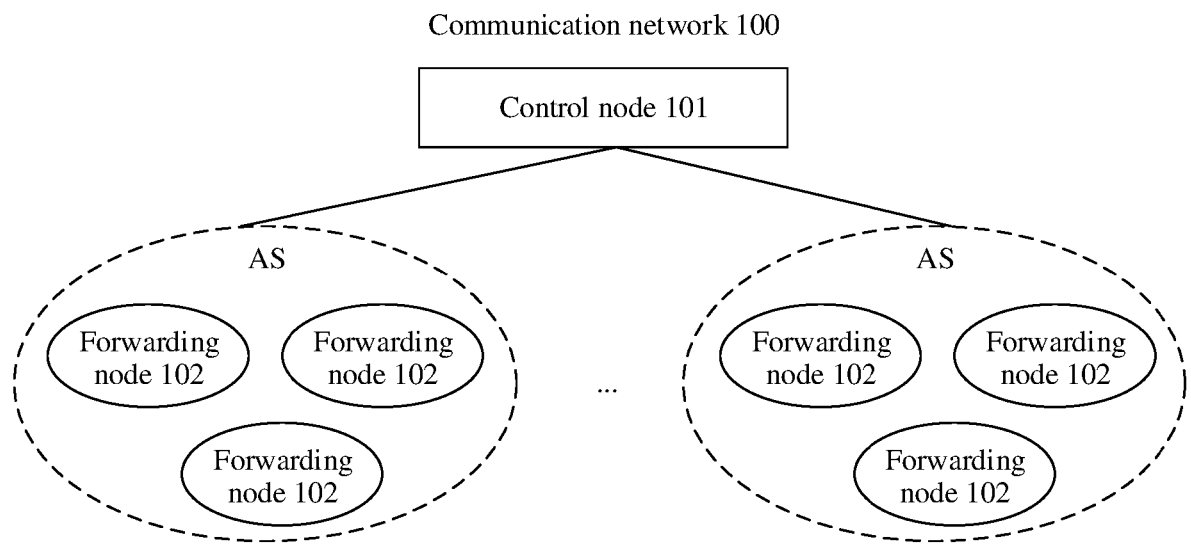
FIG. 1 is a schematic diagram of an architecture of a communication network according to an embodiment.

To make the objectives, solutions, and advantages of the embodiments clearer, the following further describes the embodiments in detail with reference to the accompanying drawings.

Before the method for configuring performance measurement indication information provided in embodiments is explained and described, scenarios in embodiments are first explained and described.

Currently, more attention is paid to intelligent network operation and management. Intelligent network operation and management include performance measurement that is performed on various data flows in a network. When performance measurement is performed on a data flow, a large amount of real-time information at a forwarding device layer needs to be collected to implement visualization of a forwarding plane. Currently, a large amount of real-time information at the forwarding device layer may be collected by collecting telemetry (telemetry) information. The telemetry information may include device inventory information and link status information that are collected based on a protocol such as the simple network management protocol (SNMP)/NetConf. The telemetry information may further include protocol routing status information collected based on the network management protocol (NMP) that is extended based on a control protocol. The telemetry information may further include traffic characteristics collected based on the NetStream protocol, and may also include per-packet service-level agreement (SLA) information and path information of 5-tuple flows based on the in-site operation, administration and maintenance (iOAM) protocol.

The in-site flow info telemetry (iFIT) or iOAM technology is a per-packet in-band performance measurement technology for a specified flow in the industry. Before performance measurement is performed by using either of the two technologies, performance measurement indication information needs to be first configured by using a command line or in a Netconf manner on each node in each AS. For example, 5-tuple attributes of a data flow and a data measurement instruction that needs to be encapsulated are configured on a head node, and the 5-tuple attributes of the data flow and a decapsulation instruction are configured on a tail node. The 5-tuple attributes of the data flow are used to indicate a type of data flow on which performance measurement is to be performed.

After the performance measurement indication information is configured on each node, the head node may insert a telemetry instruction header (TIH) into a data packet, to instruct each intermediate node to collect measurement data (Metadata) based on the TIH and report the collected measurement data.

However, in the foregoing process of configuring the performance measurement indication information, the performance measurement indication information is configured on each forwarding device by using a command line or in a NetConf/YANG manner to enable each forwarding device. In this way, when a domain to which the data flow belongs spans a plurality of ASs, the performance measurement indication information needs to be configured for each AS. Consequently, efficiency of enabling each forwarding device is extremely low.

Currently, end-to-end (E2E) performance measurement is generally cross-AS performance measurement. For example, in an enterprise private line scenario, a data flow generally spans a plurality of controllers in different domains because the data flow is transmitted on a cloud private line after being transmitted on internet protocol radio access network (IPRAN), aggregation, and backbone networks. Currently, an SDN underlying controller is only responsible for automated service provisioning and configuration in each AS. Therefore, for E2E performance measurement, a control domain of a controller may likely be inconsistent with a domain to which the data flow belongs. In this case, efficiency of configuring the performance measurement indication by using the command line or in the NetConf manner is very low. Therefore, an embodiment provides a method for configuring performance measurement indication information. Performance measurement indication information is uniformly and automatically configured on a node in each AS by using an extended control protocol, to implement automatic performance measurement on a data flow.

FIG. 1 is a schematic diagram of an architecture of a communication network according to an embodiment. As shown in FIG. 1, the communication network 100 includes a control node 101 and a plurality of forwarding nodes 102. Any forwarding node 102 may be connected to the control node 101 in a wired or wireless manner for communication.

The forwarding nodes 102 may be located in different ASs. FIG. 1 merely uses forwarding nodes in two ASs as an example for description. This does not constitute a limitation on ASs in which the forwarding nodes 102 are located.

The control node 101 is configured to deliver performance measurement indication information to each forwarding node 102 by using the method provided in this embodiment, so that the performance measurement indication information can be configured without using a command line or NetConf. In this way, when a data flow on which performance measurement needs to be performed spans a plurality of ASs, forwarding nodes in different ASs may be enabled by performing only one operation on the control node, so that efficiency of enabling the forwarding nodes is improved.

The forwarding node in FIG. 1 may also be referred to as a network element, a forwarding device, or the like. This is not limited herein.

In addition, the control node in FIG. 1 may be a device in a communication network, such as a controller, or a centralized network performance analyzer, and the forwarding node may be a device such as a router or a layer-3 switch. This is also not limited herein. In addition, it should be noted that the control node is a control node that may deliver an advertisement packet to a plurality of different ASs based on the BGP. In other words, the control node in this embodiment is a control node on top of an AS layer, and is not a control node inside an AS.

The following describes in detail the method for configuring performance measurement indication information provided in an embodiment.

Figure 2:
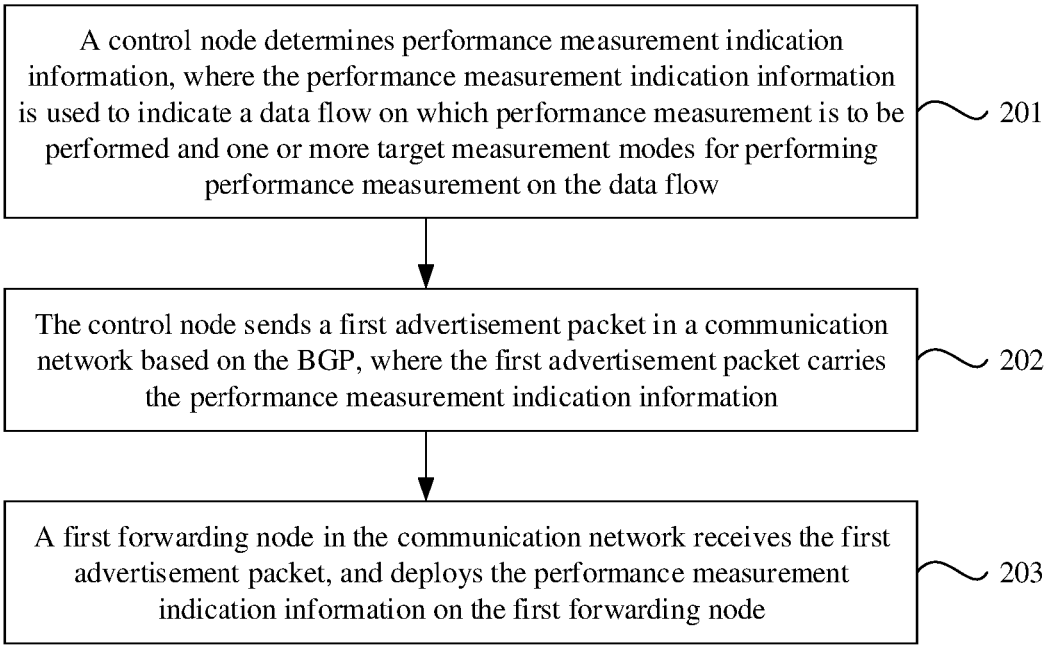
FIG. 2 is a flowchart of a method for configuring performance measurement indication information according to an embodiment.

FIG. 2 is a flowchart of a method for configuring performance measurement indication information according to an embodiment. As shown in FIG. 2, this method includes the following several steps.

Step 201: A control node determines performance measurement indication information, where the performance measurement indication information is used to indicate a data flow on which performance measurement is to be performed and one or more target measurement modes for performing performance measurement on the data flow.

For ease of subsequent description, a data flow on which performance measurement is to be performed is referred to as a target data flow. In a possible implementation, when performance measurement needs to be performed on the target data flow, the control node may directly determine the performance measurement indication information, so that the performance measurement indication information is configured on each forwarding node by using the following step 202 and step 203. In this scenario, the control node may not need to consider a performance measurement capability of each forwarding node, and only needs to deliver the performance measurement indication information by using the following step 202 and step 203.

Optionally, after the performance measurement indication information is delivered to each forwarding node, if each forwarding node does not have a capability of a measurement mode indicated in the performance measurement indication information, each forwarding node cannot successfully perform performance measurement on the target data flow. Therefore, in another possible implementation, this embodiment further supports discovery of a performance measurement capability of each forwarding node.

At least two forwarding nodes in a plurality of forwarding nodes in a communication network may send second advertisement packets, where the second advertisement packet includes indication information that is used to indicate a measurement mode supported by a sender of the second advertisement packet. In this way, the control node may receive the second advertisement packets sent by the at least two forwarding nodes. In this scenario, the control node may obtain, in advance, a measurement mode supported by each forwarding node.

In step 201, an implementation in which the control node determines performance measurement indication information may be: obtaining one or more alternative measurement modes for performing performance measurement on the target data flow; selecting an effective measurement mode, as the one or more target measurement modes, from the one or more alternative measurement modes based on the second advertisement packet; and generating the performance measurement indication information based on the one or more target measurement modes. In other words, the measurement mode indicated in the performance measurement indication information is an effective measurement mode determined by the control node.

An implementation of selecting an effective measurement mode from the one or more alternative measurement modes based on the second advertisement packet may be: determining a second forwarding packet reported by each node on a forwarding path of the target data flow; and for any alternative measurement mode, if the alternative measurement mode is supported in the second advertisement packet reported by each node on a forwarding path of the target data flow, determining the alternative measurement mode as the effective measurement mode. Alternatively, if a quantity of nodes, in all nodes on a forwarding path of the target data flow, reporting in the second advertisement packets that the alternative measurement mode is supported is greater than a proportion, the alternative measurement mode is determined as an effective measurement mode. An implementation of determining an effective measurement mode is not limited in this embodiment. In other words, a manner of determining an effective measurement mode does not strongly couple with a quantity of nodes, in all nodes on a forwarding path of the target data flow, reporting in the second advertisement packets that the alternative measurement mode is supported.

In addition, the second advertisement packet may be implemented by using an extended IGP packet. This is not described in detail in this embodiment. For example, an in-situ flow info telemetry (iFIT) capability of a forwarding node may be discovered by using an extended IGP packet.

Step 202: The control node sends a first advertisement packet in a communication network based on the BGP, where the first advertisement packet carries the performance measurement indication information.

In this embodiment, to uniformly configure the performance measurement indication information on forwarding nodes in different ASs, the BGP protocol may be extended to obtain the first advertisement packet, so as to send the performance measurement indication information in the first advertisement packet.

In a possible implementation, a BGP flow specification (FS) FS packet in the current BGP protocol may be extended, to obtain the first advertisement packet in this embodiment. In other words, the first advertisement packet may be a BGP FS packet.

For ease of subsequent description, the BGP FS packet is first briefly described herein. The BGP FS packet is a type of route packet defined in the standard BGP protocol. The BGP FS packet includes BGP network layer reachability information (NLRI) and an extended community attribute. The BGP FS packet may carry, by using the network layer reachability information and the extended community attribute, a traffic filter condition and an action that is to be performed after the traffic is filtered. The network layer reachability information in the BGP FS packet may be used to indicate a traffic filter condition, and the extended community attribute in the BGP FS packet may be used to indicate an action that is to be performed after the traffic is filtered.

Table 1 and Table 2 are respectively schematic tables of network layer reachability information and an extended community attribute in a BGP FS packet according to an embodiment. Table 1 indicates traffic filter conditions. Table 1 lists different filter conditions indicated by different types of network layer reachability information. These filter conditions may include a destination address of an IPv4/IPv6 type, a source address of an IPv4/IPv6 type, and the like. Table 2 indicates an action that is to be performed on the traffic that meets the filter condition. Table 2 lists types of actions, for example, an action of controlling a traffic rate that may be performed on the traffic that meets the filter condition shown in Table 1.

TABLE 1

| NLRI type (type) | Filter condition |
| --- | --- |
| Type 1 | IPv4/IPv6 destination address |
| Type 2 | IPv4/IPv6 source address |
| Type 3 | IPv4 protocol or IPv6 next header (NextHeader) |
| Type 4 | IPv4/IPv6 source or destination port |
| Type 5 | IPv4/IPv6 source port |
| Type 6 | IPv4/IPv6 destination port |
| Type 7 | ... |
| Type 8 | ... |
| Type 9 | ... |
| Type 10 | ... |
| Type 11 | ... |
| Type 12 | ... |
| Type 13 | ... |

TABLE 2

| Action type | Action |
| --- | --- |
| 0X8006 | Control a traffic rate |
| ... | ... |

Therefore, in this embodiment, an original function of the BGP FS packet may be used to implement the performance measurement indication information. In this case, a new type of network layer reachability information may be defined to indicate a target data flow on which performance measurement is to be performed, and a new type of action is defined to indicate a measurement mode for performing performance measurement on the target data flow.

In other words, an extended BGP FS packet includes network layer reachability information and action indication information. The network layer reachability information carries first indication information, and the first indication information is used to indicate the target data flow. The action indication information carries second indication information, and the second indication information is used to indicate one or more target measurement modes for performing performance measurement on the data flow. The performance measurement indication information may be implemented by using the first indication information and the second indication information.

In addition, for ease of indicating a target measurement mode for performing performance measurement on the target data flow, the foregoing second indication information may include a bitmap field, the bitmap field includes a plurality of bits that are in a one-to-one correspondence with a plurality of measurement modes, a bit value of a bit that corresponds to each target measurement mode and that is in the plurality of bits is a first bit value, and the first bit value is used to indicate to enable the corresponding measurement mode. For example, the first bit value may be 1.

Figure 3:
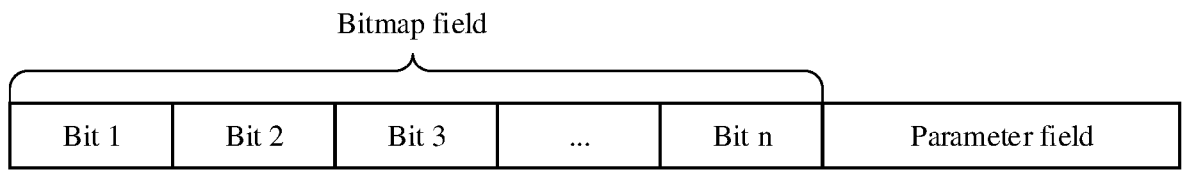
FIG. 3 is a schematic diagram of a bitmap field according to an embodiment.

For example, FIG. 3 is a schematic diagram of a bitmap field according to an embodiment. As shown in FIG. 3, the bitmap field includes n bits, and each bit corresponds to one measurement mode. A bit 1 corresponds to a measurement mode 1, a bit 2 corresponds to a measurement mode 2, and a bit n corresponds to a measurement mode n. The n measurement modes may be measurement modes such as inband-flow info telemetry postcard trace (iFIT PT trace), insite-operation administration and maintenance trace (iOAM trace), and end-to-end (E2E) measurement modes. If bit values of the bit 1, a bit 3, and the bit n in the bitmap field are 1, and bit values of other bits are 0, it indicates that performance measurement needs to be performed on a target data flow based on the measurement mode 1, a measurement mode 3, and the measurement mode n.

After the target measurement mode is configured, if each forwarding node can obtain, in advance by using another method or element (for example, manual configuration), a type of data to be measured in each measurement mode, the performance measurement indication information does not need to carry the type of the data to be measured in each measurement mode.

Optionally, if each forwarding node cannot obtain, in advance, a type of data to be measured in each measurement mode, the action indication information may further carry third indication information. The third indication information is used to indicate a measurement data type associated with each of the one or more target measurement modes, and the measurement data type associated with each target measurement mode is used to indicate measurement data to be collected in the corresponding target measurement mode. In this way, subsequently, after determining the target measurement mode, each forwarding node collects the measurement data based on the measurement data type associated with the target measurement mode.

In a possible implementation, as shown in FIG. 3, the third indication information includes a parameter field, and the parameter field is used to indicate the measurement data type associated with each target measurement mode. In other words, a parameter field is set in the third indication information, to indicate the measurement data type associated with each target measurement mode.

It should be noted that the third indication information may only carry the measurement data type associated with each target measurement mode. In this way, network resources used for sending first advertisement packets may be reduced. Optionally, to avoid that the third indication information needs to be updated each time performance measurement is performed, the third indication information may carry measurement data types associated with all measurement modes. In this case, a target measurement mode may be determined based on the second indication information, and further, a type of to-be-collected data is determined based on the third indication information.

In addition, the first indication information may use a filter condition in a current BGP FS packet. In this case, the first indication information may include 5-tuple attributes of the target data flow. The first indication information may include a source address, a source port, a destination address, a destination port, and a protocol that are of the target data flow. The protocol is used to indicate a protocol that is used to forward a data packet in the target data flow. Additionally, in this embodiment, the first indication information may alternatively indicate the target data flow in another manner. Examples are not described one by one herein.

The foregoing describes the first advertisement packet provided in this embodiment by using the BGP FS packet as an example. Optionally, the first advertisement packet may be implemented by using another packet in the BGP protocol, or the first advertisement packet is implemented by defining a new packet in the BGP protocol. This is not limited herein.

Step 203: A first forwarding node in the communication network receives the first advertisement packet and deploys the performance measurement indication information on the first forwarding node.

After the control node sends the first advertisement packet in step 202, each forwarding node in the communication network may configure, on each forwarding node and based on step 203, the performance measurement indication information that is carried in the first advertisement packet. The first forwarding node may be any forwarding node in the communication network, and details are not described herein again.

After the first forwarding node configures the performance measurement indication message on the first forwarding node, subsequently, for any data flow, the first forwarding node may perform performance measurement on the data flow based on the performance measurement indication information. For an implementation of subsequent performance measurement on any data flow based on the performance measurement indication information, refer to a related technology. Details are not described herein again. For example, when receiving a packet of the data flow, a head node in an AS may encapsulate, in the packet according to preconfigured measurement indication information, a packet header that is used to indicate performance measurement, so that each intermediate node in the AS collects information according to the packet header.

In this embodiment, the BGP is extended, so that the control node in the communication network can send, based on the extended BGP, the first advertisement packet that carries the performance measurement indication information. In this way, when a data flow on which performance measurement is to be performed is transmitted between a plurality of different ASs, each forwarding node in the different ASs may obtain the performance measurement indication information from the first advertisement packet, so that the performance measurement indication information is configured on each forwarding node. In other words, the first advertisement packet may be used to uniformly configure the performance measurement indication information for each forwarding node in each AS based on a complete transmission chain of the data flow. In this way, the performance measurement indication information does not need to be manually configured for each AS in the transmission chain of the data flow through the control node in the AS, so that efficiency of configuring the performance measurement indication information is improved.

Figure 4:
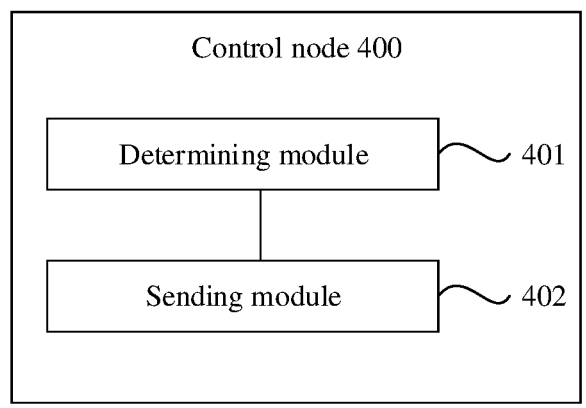
FIG. 4 is a schematic diagram of a structure of a control node according to an embodiment.

FIG. 4 is a schematic diagram of a structure of a control node in a communication network according to an embodiment. The communication network further includes a plurality of forwarding nodes, and the plurality of forwarding nodes are located in different ASs. As shown in FIG. 4, the control node includes:

a determining module 401, configured to determine performance measurement indication information, where the performance measurement indication information is used to indicate a data flow on which performance measurement is to be performed and one or more target measurement modes for performing performance measurement on the data flow; for an implementation, reference may be made to step 201 in the embodiment in FIG. 2; and a sending module 402, configured to send a first advertisement packet in the communication network based on the border gateway protocol BGP, where the first advertisement packet carries the performance measurement indication information, so that the plurality of forwarding nodes configure the performance measurement indication information on the plurality of forwarding nodes; and for an implementation, reference may be made to step 202 in the embodiment in FIG. 2.

Optionally, the first advertisement packet is a BGP FS packet, and the BGP FS packet includes network layer reachability information and action indication information.

The network layer reachability information carries first indication information, the first indication information is used to indicate the data flow, the action indication information carries second indication information, and the second indication information is used to indicate the one or more target measurement modes.

Optionally, the action indication information further carries third indication information, the third indication information is used to indicate a measurement data type associated with each of the one or more target measurement modes, and the measurement data type associated with each target measurement mode is used to indicate measurement data to be collected in the corresponding target measurement mode.

Optionally, the second indication information includes a bitmap field, the bitmap field includes a plurality of bits that are in a one-to-one correspondence with a plurality of measurement modes, a bit value of a bit that corresponds to each target measurement mode and that is in the plurality of bits is a first bit value, and the first bit value is used to indicate to enable a corresponding measurement mode.

Optionally, the third indication information includes a parameter field, and the parameter field is used to indicate a measurement data type associated with each target measurement mode.

Optionally, the first indication information includes a source address, a source port, a destination address, a destination port, and a protocol that are of the data flow, and the protocol is used to indicate a protocol used to forward a data packet in the data flow.

Optionally, the control node further includes:

a receiving module, configured to receive second advertisement packets sent by at least two forwarding nodes in the plurality of forwarding nodes, where the second advertisement packet includes indication information that is used to indicate a measurement mode supported by a sender of the second advertisement packet; and the determining module is configured to:
obtain one or more alternative measurement modes for performing performance measurement on the data flow;
select an effective measurement mode, as the one or more target measurement modes, from the one or more alternative measurement modes based on the second advertisement packet; and
generate the performance measurement indication information based on the one or more target measurement modes.

In this embodiment, the BGP is extended, so that the control node in the communication network can send, based on the extended BGP, the first advertisement packet that carries the performance measurement indication information. In this way, when a data flow on which performance measurement is to be performed is transmitted between a plurality of different ASs, each forwarding node in the different ASs may obtain the performance measurement indication information from the first advertisement packet, so that the performance measurement indication information is configured on each forwarding node. In other words, the first advertisement packet may be used to uniformly configure the performance measurement indication information for each forwarding node in each AS based on a complete transmission chain of the data flow. In this way, the performance measurement indication information does not need to be manually configured for each AS in the transmission chain of the data flow through the control node in the AS, so that efficiency of configuring the performance measurement indication information is improved.

It should be noted that, when the control node provided in the foregoing embodiment configures the performance measurement indication information, division of the foregoing functional modules is merely used as an example for description. In actual application, the foregoing functions may be allocated as required to different functional modules for implementation. In other words, an internal structure of a device is divided into different functional modules, to implement all or some of the foregoing functions. In addition, the foregoing embodiment in which the control node is provided and the method embodiment in which configuration of the performance measurement indication information is triggered belong to a same concept. For an implementation process thereof, refer to the method embodiment, and details are not described herein again.

Figure 5:
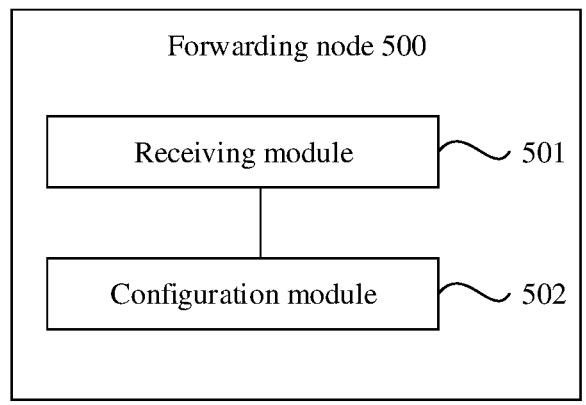
FIG. 5 is a schematic diagram of a structure of a forwarding node according to an embodiment.

FIG. 5 is a schematic diagram of a structure of a forwarding node in a communication network according to an embodiment. The communication network further includes a plurality of forwarding nodes, and the plurality of forwarding nodes are located in different ASs. As shown in FIG. 5, the forwarding node 500 includes:
a receiving module 501, configured to receive a first advertisement packet that is sent in the communication network by the control node based on the border gateway protocol BGP, where the first advertisement packet carries performance measurement indication information, the performance measurement indication information is used to indicate a data flow on which performance measurement is to be performed and one or more target measurement modes for performing performance measurement on the data flow, and for an implementation, reference may be made to step 203 in the embodiment in FIG. 2; and
a configuration module 502, configured to configure the performance measurement indication information on the forwarding node, and for an implementation, reference may be made to step 203 in the embodiment in FIG. 2.

In this embodiment, the BGP is extended, so that the control node in the communication network can send, based on the extended BGP, the first advertisement packet that carries the performance measurement indication information. In this way, when a data flow on which performance measurement is to be performed is transmitted between a plurality of different ASs, each forwarding node in the different ASs may obtain the performance measurement indication information from the first advertisement packet, so that the performance measurement indication information is configured on each forwarding node. In other words, the first advertisement packet may be used to uniformly configure the performance measurement indication information for each forwarding node in each AS based on a complete transmission chain of the data flow. In this way, the performance measurement indication information does not need to be manually configured for each AS in the transmission chain of the data flow through the control node in the AS, so that efficiency of configuring the performance measurement indication information is improved.

It should be noted that, when the forwarding node provided in the foregoing embodiment configures the performance measurement indication information, division of the foregoing functional modules is merely used as an example for description. In actual application, the foregoing functions may be allocated as required to different functional modules for implementation. In other words, an internal structure of a device is divided into different functional modules, to implement all or some of the foregoing functions. In addition, the foregoing embodiment in which the forwarding node is provided and the method embodiment in which configuration of the performance measurement indication information is triggered belong to a same concept. For an implementation process thereof, refer to the method embodiment, and details are not described herein again.

Figure 6:
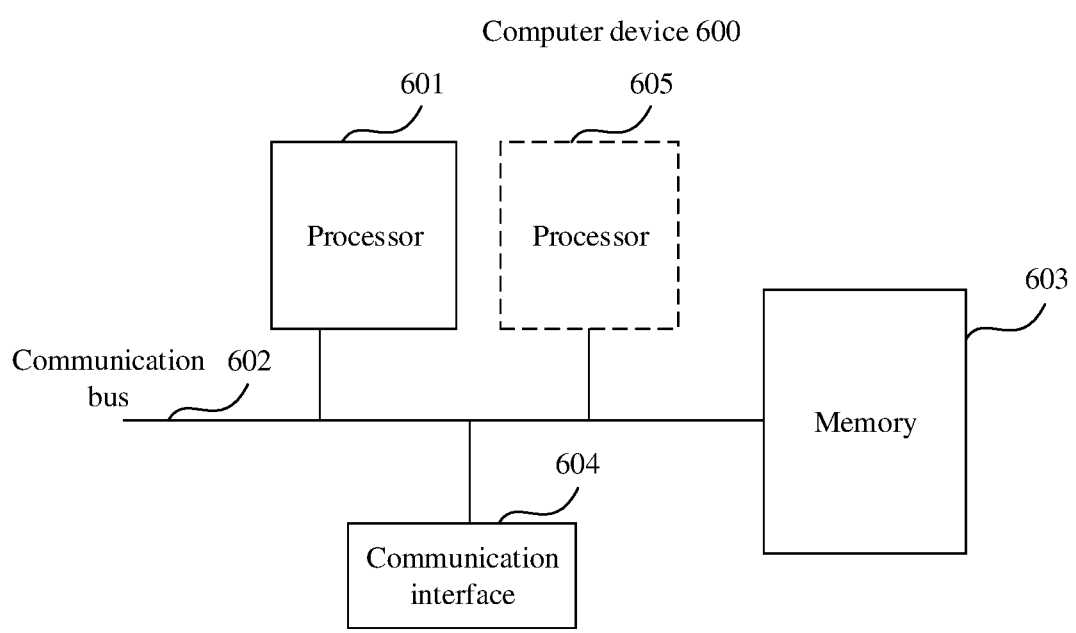
FIG. 6 is a schematic diagram of a structure of a computer device according to an embodiment.

FIG. 6 is a schematic diagram of a structure of a computer device according to an embodiment. The control node or the forwarding node in embodiments may be implemented by using the computer device shown in FIG. 6. With reference to FIG. 6, the computer device 600 includes at least one processor 601, a communication bus 602, a memory 603, and at least one communication interface 604.

The processor 601 may be a general-purpose central processing unit (CPU), an application-specific integrated circuit (ASIC), or one or more integrated circuits configured to control program execution. When the computer device is the control node provided in this embodiment, the processor may be configured to determine the performance measurement indication information by performing step 201 in the embodiment shown in FIG. 2. When the computer device is the forwarding node provided in embodiments, the processor may be configured to configure the performance measurement indication information on the forwarding node by performing step 203 in the embodiment shown in FIG. 2.

The communication bus 602 may include a path on which information is transmitted between the foregoing components.

The memory 603 may be a read-only memory (ROM) or another type of static storage device that is capable of storing static information and instructions, a random access memory (RAM) or another type of dynamic storage device that is capable of storing information and instructions, or may be an electrically erasable programmable read-only memory (EEPROM), a compact disc read-only memory (CD-ROM), or another compact disc storage, an optical disc storage (including a compact disc, a laser disc, an optical disc, a digital versatile disc, a Blu-ray disc, and the like), a magnetic disk or another magnetic storage device, or any other medium that can be used to carry or store an expected program code in a form of instructions or a data structure and that can be accessed by a computer, but is not limited thereto. The memory 603 may exist independently and is connected to the processor 601 through the communication bus 602. Alternatively, the memory 603 may be integrated with the processor 601.

The memory 603 is configured to store program code for executing the solutions, and the processor 601 controls the execution. The processor 601 is configured to execute the program code stored in the memory 603. The program code may include one or more software modules. For example, the program code may include modules shown in FIG. 4.

The communication interface 604 uses any transceiver-type apparatus and is configured to communicate with another device or communication network, such as the Ethernet, a radio access network (RAN), or a wireless local area network (WLAN). When the computer device is the control node provided in embodiments, the communication interface may be configured to send a first advertisement packet by performing step 202 in the embodiment shown in FIG. 2. When the computer device is the forwarding node provided in this embodiment, the communication interface may be configured to receive a first advertisement packet by performing step 203 in the embodiment shown in FIG. 2.

In an embodiment, the computer device may include a plurality of processors, for example, the processor 601 and the processor 605 that are shown in FIG. 6. Each of the processors may be a single-core (single-CPU) processor or may be a multi-core (multi-CPU) processor. The processor herein may be one or more devices, circuits, and/or processing cores for processing data (for example, computer program instructions).

The computer device may be a general-purpose computer device or a special-purpose computer device. In an implementation, the computer device may be a desktop computer, a portable computer, a network server, a personal digital assistant (PDA), a mobile phone, a tablet, a wireless terminal device, a communication device, or an embedded device. A type of the computer device is not limited in this embodiment.

In addition, an embodiment further provides a system for configuring performance measurement indication information. The system includes a control node and a plurality of forwarding nodes, and the plurality of forwarding nodes are located in different Ass, where the control node is configured to determine performance measurement indication information, where the performance measurement indication information is used to indicate a data flow on which performance measurement is to be performed and one or more target measurement modes for performing performance measurement on the data flow;

the control node is further configured to send a first advertisement packet in the communication network based on the BGP, where the first advertisement packet carries the performance measurement indication information, so that the plurality of forwarding nodes configure the performance measurement indication information on the plurality of forwarding nodes;

any one of the plurality of forwarding nodes is configured to receive the first advertisement packet that is sent in the communication network by the control node; and the forwarding node is further configured to configure the performance measurement indication information on the forwarding node.

Optionally, the first advertisement packet is a BGP FS packet, and the BGP FS packet includes network layer reachability information and action indication information.

The network layer reachability information carries first indication information, the first indication information is used to indicate the data flow, the action indication information carries second indication information, and the second indication information is used to indicate the one or more target measurement modes.

Optionally, the action indication information further carries third indication information, the third indication information is used to indicate a measurement data type associated with each of the one or more target measurement modes, and the measurement data type associated with each target measurement mode is used to indicate measurement data to be collected in the corresponding target measurement mode.

Optionally, the second indication information includes a bitmap field, the bitmap field includes a plurality of bits that are in a one-to-one correspondence with a plurality of measurement modes, a bit value of a bit that corresponds to each target measurement mode and that is in the plurality of bits is a first bit value, and the first bit value is used to indicate to enable a corresponding measurement mode.

Optionally, the third indication information includes a parameter field, and the parameter field is used to indicate a measurement data type associated with each target measurement mode.

Optionally, the first indication information includes a source address, a source port, a destination address, a destination port, and a protocol that are of the data flow, and the protocol is used to indicate a protocol used to forward a data packet in the data flow.

Optionally, the control node is further configured to:

receive second advertisement packets sent by at least two forwarding nodes in the plurality of forwarding nodes, where the second advertisement packet includes indication information that is used to indicate a measurement mode supported by a sender of the second advertisement packet;

obtain one or more alternative measurement modes for performing performance measurement on the data flow;

select an effective measurement mode, as the one or more target measurement modes, from the one or more alternative measurement modes based on the second advertisement packet; and generate the performance measurement indication information based on the one or more target measurement modes.

For an implementation of the control node and the forwarding node in the system, reference may be made to the embodiment shown in FIG. 2. Details are not described herein again.

All or some of the foregoing embodiments may be implemented by software, hardware, firmware, or any combination thereof. When the software is used to implement the embodiments, all or some of the embodiments may be implemented in a form of a computer program product. The computer program product includes one or more computer instructions. When the computer instructions are loaded and executed on the computer, the procedure or functions according to embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer or includes one or more data storage devices such as a server or a data center that is integrated by one or more usable media. The usable medium may be a magnetic medium (for example, a floppy disk, a hard disk, or a magnetic tape), an optical medium (for example, a digital versatile disc (DVD)), a semiconductor medium (for example, a solid state drive (SSD)), or the like.

A person of ordinary skill in the art may understand that all or some of the steps of the embodiments may be implemented by hardware or a program instructing related hardware. The program may be stored in a computer-readable storage medium. The foregoing storage medium may be a read-only memory, a magnetic disk, an optical disc, or the like.

The foregoing descriptions are embodiments, but are not intended as limiting. Any modification, equivalent replacement, or improvement made without departing from the spirit and principle should fall within the scope of the embodiments.

What is claimed is:

1. A method for configuring performance measurement indication information, applied to a control node in a communication network comprising a plurality of forwarding nodes located in different autonomous systems (Ass), the method comprising:
    determining, by the control node, the performance measurement indication information, wherein the performance measurement indication information is used to indicate a data flow on which performance measurement is to be performed and one or more target measurement modes for performing performance measurement on the data flow; and
    sending, by the control node, a first advertisement packet in the communication network based on a border gateway protocol (BGP), wherein the first advertisement packet carries the performance measurement indication information, so that the plurality of forwarding nodes configures the performance measurement indication information on the plurality of forwarding nodes,
    wherein the first advertisement packet is a border gateway protocol flow specification (BGP FS) packet comprising network layer reachability information and action indication information; and
    the network layer reachability information carries first indication information, the first indication information is used to indicate the data flow, the action indication information carries second indication information, and the second indication information is used to indicate the one or more target measurement modes.

2. The method according to claim 1, wherein the action indication information further carries third indication information used to indicate a measurement data type associated with each of the one or more target measurement modes, and the measurement data type associated with each target measurement mode is used to indicate measurement data to be collected in the corresponding target measurement mode.

3. The method according to claim 1, wherein the second indication information further comprises a bitmap field comprising a plurality of bits that are in a one-to-one correspondence with a plurality of measurement modes, a bit value of a bit that corresponds to each target measurement mode and that is in the plurality of bits is a first bit value, and the first bit value is used to indicate to enable the corresponding measurement mode.

4. The method according to claim 2, wherein the third indication information further comprises a parameter field used to indicate the measurement data type associated with each target measurement mode.

5. The method according to claim 1, wherein the first indication information further comprises a source address, a source port, a destination address, a destination port, and a protocol that are of the data flow, and the protocol is used to indicate a protocol used to forward a data packet in the data flow.

6. The method according to claim 1, further comprising:
    receiving, by the control node, second advertisement packets sent by at least two forwarding nodes in the plurality of forwarding nodes, wherein the second advertisement packet comprises indication information that is used to indicate a measurement mode supported by a sender of the second advertisement packet; obtaining, by the control node, one or more alternative measurement modes for performing performance measurement on the data flow;
    selecting, by the control node, an effective measurement mode, as the one or more target measurement modes, from the one or more alternative measurement modes based on the second advertisement packet; and
    generating, by the control node, the performance measurement indication information based on the one or more target measurement modes.

7. A method for configuring performance measurement indication information, applied to any forwarding node in a communication network comprising a plurality of forwarding nodes and a control node, the plurality of forwarding nodes is located in different autonomous systems ASs, the method comprising:
    receiving, by the forwarding node, a first advertisement packet sent by the control node in the communication network based on a border gateway protocol (BGP), wherein the first advertisement packet carries the performance measurement indication information, and the performance measurement indication information is used to indicate a data flow on which performance measurement is to be performed and one or more target measurement modes for performing performance measurement on the data flow; and
    configuring, by the forwarding node, the performance measurement indication information on the forwarding node,
    wherein the first advertisement packet is a border gateway protocol flow specification (BGP FS) packet comprising network layer reachability information and action indication information; and
    the network layer reachability information carries first indication information, the first indication information is used to indicate the data flow, the action indication information carries second indication information, and the second indication information is used to indicate the one or more target measurement modes.

8. A control node in a communication network, wherein the communication network comprises a plurality of forwarding nodes located in different autonomous systems Ass, and the control node comprises:
    at least one processor; and
    one or more memories coupled to the at least one processor and configured to store instructions for execution by the at least one processor, the instructions instruct the at least one processor to cause the control node to:

determine performance measurement indication information, wherein the performance measurement indication information is used to indicate a data flow on which performance measurement is to be performed and one or more target measurement modes for performing performance measurement on the data flow; and send a first advertisement packet in the communication network based on a border gateway protocol (BGP), wherein the first advertisement packet carries the performance measurement indication information, so that the plurality of forwarding nodes configures the performance measurement indication information on the plurality of forwarding nodes, wherein the first advertisement packet is a border gateway protocol flow specification (BGP FS) packet comprising network layer reachability information and action indication information; and the network layer reachability information carries first indication information, the first indication information is used to indicate the data flow, the action indication information carries second indication information, and the second indication information is used to indicate the one or more target measurement modes.

9. The control node according to claim 8, wherein the action indication information further carries third indication information, the third indication information is used to indicate a measurement data type associated with each of the one or more target measurement modes, and the measurement data type associated with each target measurement mode is used to indicate measurement data to be collected in the corresponding target measurement mode.

10. The control node according to claim 8, wherein the second indication information further comprises a bitmap field comprising a plurality of bits that are in a one-to-one correspondence with a plurality of measurement modes, a bit value of a bit that corresponds to each target measurement mode and that is in the plurality of bits is a first bit value, and the first bit value is used to indicate to enable the corresponding measurement mode.

11. The control node according to claim 9, wherein the third indication information further comprises a parameter field used to indicate the measurement data type associated with each target measurement mode.

12. The control node according to claim 8, wherein the first indication information further comprises a source address, a source port, a destination address, a destination port, and a protocol used to forward a data packet in the data flow.

13. The control node according to claim 8, wherein the instructions further instruct the at least one processor to cause the first network device to:

receive second advertisement packets sent by at least two forwarding nodes in the plurality of forwarding nodes, wherein the second advertisement packet comprises indication information that is used to indicate a measurement mode supported by a sender of the second advertisement packet; and obtain one or more alternative measurement modes for performing performance measurement on the data flow;

select an effective measurement mode, as the one or more target measurement modes, from the one or more alternative measurement modes based on the second advertisement packet; and generate the performance measurement indication information based on the one or more target measurement modes.

14. A forwarding node in a communication network comprising a plurality of forwarding nodes and a control node, the plurality of forwarding nodes located in different autonomous systems ASs, and any one of the plurality of forwarding nodes comprises:

at least one processor; and one or more memories coupled to the at least one processor and configured to store instructions for execution by the at least one processor, the instructions instruct the at least one processor to cause the forwarding node to:

receive a first advertisement packet that is sent in the communication network by the control node based on a border gateway protocol (BGP), wherein the first advertisement packet carries performance measurement indication information, and the performance measurement indication information is used to indicate a data flow on which performance measurement is to be performed and one or more target measurement modes for performing performance measurement on the data flow; and configure the performance measurement indication information on the configuration module, wherein the first advertisement packet is a border gateway protocol flow specification (BGP FS) packet comprising network layer reachability information and action indication information; and the network layer reachability information carries first indication information, the first indication information is used to indicate the data flow, the action indication information carries second indication information, and the second indication information is used to indicate the one or more target measurement modes.

\* \* \* \* \*